United States Patent
Yu et al.

(10) Patent No.: US 11,696,529 B2
(45) Date of Patent: Jul. 11, 2023

(54) RADIO FREQUENCY GRAIN MASS AND CONSTITUENT MEASUREMENT SYSTEMS FOR COMBINE HARVESTERS

(71) Applicant: Deere & Company, Moline, IL (US)

(72) Inventors: Wentao Yu, Bettendorf, IA (US); Volker Fuchs, Saarburg (DE); Gurmukh Advani, West Fargo, ND (US); Noel W. Anderson, Fargo, ND (US)

(73) Assignee: DEERE & COMPANY, Moline, IL (US)

( * ) Notice: Subject to any disclaimer, the term of this patent is extended or adjusted under 35 U.S.C. 154(b) by 803 days.

(21) Appl. No.: 16/601,219

(22) Filed: Oct. 14, 2019

(65) Prior Publication Data

US 2021/0105941 A1 Apr. 15, 2021

(51) Int. Cl.
*A01D 41/127* (2006.01)
*G01F 1/66* (2022.01)
(Continued)

(52) U.S. Cl.
CPC ............. *A01D 41/127* (2013.01); *G01F 1/66* (2013.01); *G01S 13/88* (2013.01); *G01N 21/85* (2013.01); *G01N 2021/8592* (2013.01)

(58) Field of Classification Search
None
See application file for complete search history.

(56) References Cited

U.S. PATENT DOCUMENTS

| 5,315,243 A | 5/1994 | Kempster et al. |
| 5,708,366 A | 1/1998 | Nelson |

(Continued)

FOREIGN PATENT DOCUMENTS

| DE | 3511355 C2 | 1/1989 |
| DE | 19648126 A1 | 5/1998 |

(Continued)

OTHER PUBLICATIONS

Kormann et al., Testing Stand for Yield Measurement Systems in Combine Harvesters, 1998 ASAE Annual International Meeting, Paper No. 983102, Jul. 1988. (10 pages).
Nelson et al., Microwave Sensing of Moisture Content and Bulk Density in Flowing Grain and Seed, American Society of Agricultural and Biological Engineers, ASABE 59(2): 429-433. (doi: 10.13031/trans. 59.11377), 2016. (1 page).
(Continued)

*Primary Examiner* — Paul M. West
*Assistant Examiner* — Mark A Shabman
(74) *Attorney, Agent, or Firm* — Klintworth & Rozenblat IP LLP

(57) ABSTRACT

A radio frequency (RF) grain mass and constituent measurement system utilized onboard a combine harvester includes an RF sensor subsystem for capturing RF sensor readings of a harvested grain within an area of the combine harvester. A memory stores an RF characteristic database, which contains RF characteristic testing data collected for tested grain samples over one or more tested frequency ranges. A controller, operably coupled to the RF sensor subsystem and to the memory, is configured to: (i) receive the RF sensor readings from the RF sensor subsystem; (ii) determine grain mass and a first constituent content of the currently-harvested grain based, at least in part, on an analytical comparison between the RF sensor readings and the RF characteristic testing data; and (iii) perform at least one action in response to determining the grain mass and the first constituent content of the harvested grain.

18 Claims, 5 Drawing Sheets

(51) Int. Cl.
    *G01S 13/88*     (2006.01)
    *G01N 21/85*     (2006.01)

(56) References Cited

U.S. PATENT DOCUMENTS

| | | | |
|---|---|---|---|
| 5,934,997 | A | 8/1999 | Nelson et al. |
| 5,970,800 | A | 10/1999 | Gunneskov et al. |
| 6,147,502 | A | 11/2000 | Fryer et al. |
| 6,430,903 | B1 | 8/2002 | Christiansen et al. |
| 6,526,120 | B1 | 2/2003 | Gray et al. |
| 6,606,571 | B2 | 8/2003 | Phelan et al. |
| 6,637,179 | B2 | 10/2003 | Duncan |
| 9,410,840 | B2 | 8/2016 | Acheson et al. |
| 9,631,964 | B2 | 4/2017 | Gelinske et al. |
| 10,371,558 | B2 | 8/2019 | Tevs et al. |
| 2018/0042174 | A1* | 2/2018 | Li .................. A01D 41/127 |
| 2018/0059034 | A1* | 3/2018 | Advani ............. G01F 1/74 |
| 2019/0133037 | A1 | 5/2019 | Todd et al. |
| 2019/0137416 | A1 | 5/2019 | Todd et al. |
| 2019/0183047 | A1 | 6/2019 | Dybro et al. |
| 2021/0105941 | A1 | 4/2021 | Yu et al. |

FOREIGN PATENT DOCUMENTS

| | | |
|---|---|---|
| EP | 0840109 A2 | 5/1998 |
| EP | 0940656 A1 | 8/1999 |
| EP | 3837959 A1 | 6/2021 |

OTHER PUBLICATIONS

Chung et al., Sensing Technologies for Grain Crop Yield Monitoring Systems: A Review, Journal of Biosystems Eng. 41(4):408-417. (Dec. 2016.) https://doi.org/10.5307/JBE.2016.41.4.408, Nov. 25, 2016. (10 pages).

Badaruzzaman Mohamad Noh, Application of Microwave Sensors to Potato Products, A Thesis Submitted to the University of Manchester for the Degree of PhD In Engineering and Physical Science, 2010. (161 pages).

Ontario, "Common Weeds Poisonous to Grazing Livestock", https://www.ontario.ca/page/common-weeds-poisonous-grazing-livestock, Jul. 20, 2022. (13 pages).

Phys-Org, "Designing Sensors to Detect Foreign Bodies in Food", https://phys.org/news/2017-03-sensors-foreign-bodies-food.html, Mar. 31, 2017. (3 pages).

Liu, J. et al. "Detection of Genetically Modified Sugarcane By Using Terahertz Spectroscopy and Chemometrics", Journal of Applied Spectroscopy, vol. 85, No. 1, pp. 119, Gale Academic OneFile, http://dx.doi.org/10.1007/s10812-018-0621-9, Mar. 2018. (11 pages).

Zhang, H. et al., Abstract for "Detection of Poisonous Herbs by Terahertz Time-Domain Spectroscopy", Journal of Applied Spectroscopy, vol. 85, Issue 1, pp. 197-202, Mar. 2018. (1 page).

PMG Engineering, "Metal Contamination in Food Industry—Detection & Reduction", Sep. 18, 2020. (10 pages).

Scientific Reports, "Terahertz and Infrared Characteristic Absorption Spectra of Aqueous Glucose and Fructose Solutions", Chao Song et al., DOI:10.1038/s41598-018-27310-7, www.nature.com/scientificreports, Jun. 12, 2018. (8 pages).

Terasense Group, "Terahertz Food Inspection and Quality Control" | TeraSense, https://terasense.com/applications/terahertz-food-inspection/, 2008-2022, (13 pages).

Utah State University Extension, "Toxic Contaminants in Harvested Forages", Clell V. Bagley, DVM, Animal Health Fact Sheet, Jul. 1997, (4 pages).

Research Gate, Abstract for "Toxic Chemical Compound Detection by Terahertz Spectroscopy", Liu Yang, Reviews in Analytical Chemistry, https://www.researchgate.net/publication/325751558, Jun. 2018. (1 page).

MDPI-Toxins, "Mycotoxin Contamination in Sugarcane Grass and Juice: First Report on Detection of Multiple Mycotoxins and Exposure Assessment for Aflatoxins B1 and G1 in Humans", Mohamed F. Abdallah et al., http://www.mdpi.com/journal/toxins, Nov. 18, 2016. (12 pages).

\* cited by examiner

RADIO FREQUENCY GRAIN MASS AND CONSTITUENT MEASUREMENT SYSTEMS FOR COMBINE HARVESTERS

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to radio frequency-based measurement systems for estimating grain mass and composition (e.g., constituent content percentages) of grains processed by combine harvesters.

BACKGROUND OF THE DISCLOSURE

Combine harvesters (also referred to as "agricultural combines") have greatly improved the efficiency with which corn, canola, soybeans, wheat, oats, sunflowers, and other crops are harvested, threshed, cleaned, and collected for distribution to consumers. Generally, combine harvesters are relatively complex, self-propelled machines capable of harvesting large swathes of crop plants as the harvester travels over a crop field, while separating grain from material other than grain (MOG) within the harvester. After cleaning, the harvested grain is delivered into a grain storage tank, typically by conveyance through a clean grain elevator. As combine harvesters become increasingly advanced, sensor subsystems are now integrated into harvesters to measure the grain mass and moisture content of harvested grains. Assessing moisture content, in particular, improves the accuracy with which grain mass is measured, which, in turn, improves the accuracy of grain mas flow rate and grain yield calculations. Such grain-related measurements may be stored in memory and presented on a display device located within the operator cabin of the combine harvester for reference by an operator. Additionally or alternatively, on-the-fly adjustments to actuated components may be implemented in response to changes in grain mass, moisture content, or other related parameters to better optimize the performance of the combine harvester.

SUMMARY OF THE DISCLOSURE

Radio frequency (RF) grain mass and constituent measurement systems utilized onboard combine harvesters are provided. In various embodiments, the RF grain mass and constituent measurement system includes an RF sensor subsystem configured to capture RF sensor readings of a harvested grain within an area of the combine harvester containing the currently-harvested grain. A memory stores an RF characteristic database, which contains RF characteristic testing data observed for tested grain samples over one or more tested frequency ranges. A controller is operably coupled to the RF sensor subsystem and to the memory. The controller is configured to: (i) receive the RF sensor readings from the RF sensor subsystem; (ii) determine grain mass and a first constituent content of the currently-harvested grain based, at least in part, the RF sensor readings as compared to the RF characteristic testing data; and (iii) perform at least one action, including display or storing values associated with, or adjusting a component of the combine harvester, in response to determining the grain mass and the first constituent content of the currently-harvested grain.

In further embodiments, RF grain mass and constituent measurement system includes an RF sensor subsystem, a memory storing an RF characteristic database, and a controller operably coupled to the RF sensor subsystem and to the memory. The RF sensor subsystem includes, in turn, first and second RF sensors. The first RF sensor is configured to capture RF sensor readings of the currently-harvested grain at a first frequency or frequency range. Comparatively, the second RF sensor is configured to capture RF sensor readings of the currently-harvested grain at a second frequency or frequency range different than the first frequency or frequency range. The RF characteristic database contains RF characteristic testing data observed for tested grain samples over one or more tested frequency ranges. The controller is configured to: (i) receive the RF sensor readings from the RF sensor subsystem; (ii) determine grain mass and a moisture content of the currently-harvested grain based, at least in part, on the RF sensor readings as compared to the RF characteristic testing data; and (iii) perform at least one action in response to determining the grain mass and moisture content of the currently-harvested grain.

The details of one or more embodiments are set-forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures.

Figure 1:
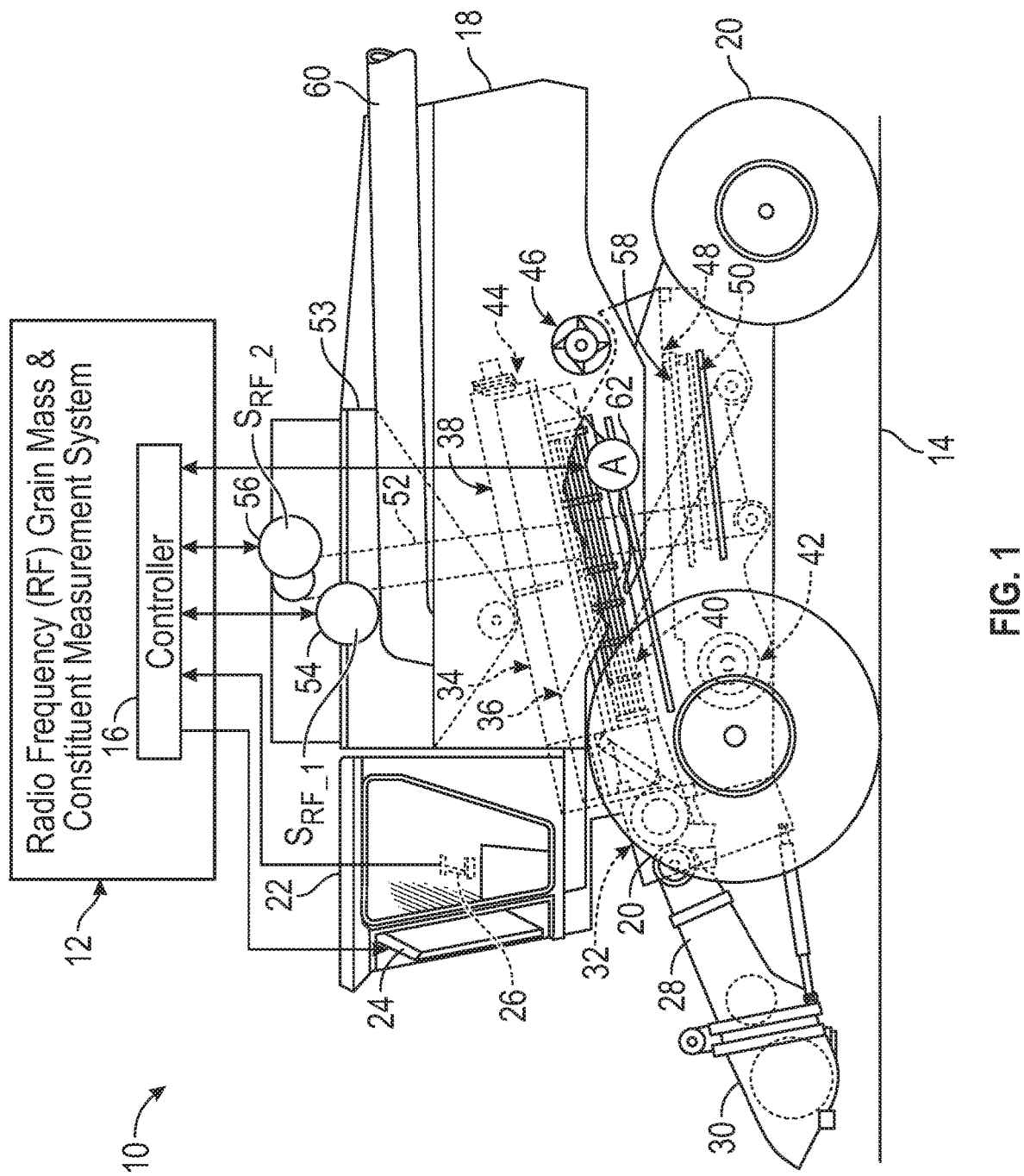
FIG. 1 is a schematic of a combine harvester equipped with the radio frequency (RF) grain and mass constituent measurement system, as illustrated in accordance with an example embodiment.

Like reference symbols in the various drawings indicate like elements. For simplicity and clarity of illustration, descriptions and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying figures of the drawings described briefly above. Various modifications to the example embodiments may be contemplated by one of skill in the art without departing from the scope of the present invention, as set-forth the appended claims.

Overview

As discussed briefly above, modern combine harvesters are equipped with sensor subsystems for measuring grain mass and moisture content of harvested grains. In one common approach, grain mass is determined by detecting the force at which harvested grain strikes a surface positioned within the outlet end of the clean grain elevator. More specifically, the strike force of the clean grain may be measured utilizing a load cell, which is positioned behind an impact plate struck by the clean grain when flung or thrown from the rotating paddles of the grain elevator. As the grain strikes the impact plate before falling into the clean grain tank, the load cell detects the force at which the grain strikes the impact plate. This strike force, taken in conjunction with the grain elevator speed, is then utilized to solve for grain mass. Once determined, grain mass can then be utilized to in grain mass flow rate and grain yield calculations, along with other known parameters, such as header width and harvester speed.

In addition to grain mass, grain moisture content is also desirably tracked by combine harvesters. The moisture content of a harvested grain impacts the propensity of the grain to spoil, shrink, or become damage during processing and storage. Additionally, variances in grain moisture content can affect the accuracy of the above-described grain mass measurements and are thus desirably compensated for when calculating grain mass. For these reasons, combine harvesters are also commonly equipped with sensors for estimating the moisture content of harvested grain. In many instances, grain moisture content is estimated by measuring capacitance across a known volume of grain, which is diverted into a test channel or "bypass" from the clean grain stream. The dimensions of the bypass determine the sampled grain volume, and electrodes (e.g., metal plates) border the sides of the bypass to enable an electrical current to be passed through the sampled grain volume to measure capacitance. The capacitance measurement is then converted to a moisture content estimate utilizing a pre-established correlation or equation, noting that electrical conductivity tends to increase (and thus capacitance tends to decrease) as the moisture content of the grain increases. The capacitance estimate may then be considered by the processing architecture or "controller" of the combine harvester to more accurately assess grain mass. In other instances, the sampled grain volume may be weighed, and the weight may be utilized to estimate grain moisture content (or grain mass) in addition to or in lieu of a capacitance measurement. After estimating grain moisture in this manner, the sampled grain volume may then be returned to the clean grain stream, and such process steps may be repeated to estimate grain moisture content on an iterative basis.

While useful in a general sense, the above-described techniques for measuring grain mass and moisture content remain limited in multiple respects. Such measurement techniques can be somewhat inaccurate, overly complex, and require repeated calibration. Consider, for example, the above-described technique for estimating the moisture content of a grain processed by a combine harvester. The need to repeatedly divert or sequester fractions of the newly-harvested grain from the clean grain stream into a dedicate bypass, measure the capacitance (or weight) of the sampled grain, and then return the sampled grain to the clean grain stream is a cumbersome process, which adds undesired cost and complexity to the combine harvester. Further, by the nature of such a quasi-random sampling process, the grain moisture estimates are taken at discrete points in time, while interrupting flow of the clean grain stream to a limited extent. In certain instances, the grain moisture estimates may be temporary offset from the strike force measurements by a significant time delay, exacerbating inaccuracies in estimating grain mass under changing grain conditions.

In view of such deficiencies, various alternative techniques for measuring grain mass and moisture content have been suggested and, in certain instances, implemented. Such alternative techniques are, however, also associated with various shortcomings. As a specific example, it has been suggested that grain mass may be measured by impinging harvested grain with high energy, ionizing radiation in the form of x-rays or gamma rays. Such an approach may permit determination of grain mass and/or moisture content by measuring the degree to which the high energy, ionizing electromagnetic (EM) radiation is absorbed into the harvested grain. This notwithstanding, proposed systems incorporating high energy emitter and receiver antennae tend to add considerable cost and complexity to the sensor subsystem, and may be subject to various governmental regulations. Further, as do more conventional techniques of the type described above, such alternative techniques for measuring grain mass and moisture content remain limited in another significant respect, as well—such measurement techniques provide little, if any additional useful information pertaining to the composition of a harvested grain beyond the moisture content estimate itself.

To overcome the above-noted deficiencies associated with such conventional grain mass measurement systems, the following discloses radio frequency-based grain mass and constituent measurement systems well suited for usage within combine harvesters. As indicated by the term "radio-frequency based," the below-described measurement systems utilize radio frequency (RF) measurements to measure or estimate the grain mass and constituent content(s) of a currently-harvested grain; that is, a grain extracted from crop plants ingested and then processed by a combine harvester equipped with the measurement system. For ease of reference, the RF-based grain mass and constituent measurement systems are alternatively referred hereafter to as "RF grain mass and constituent measurement systems." Such terminology denotes that RF grain mass and constituent measurement system utilizes RF signals in assessing grain mass and the constituent content level(s), but does not preclude the possibility that the measurement system may (and often will) utilize other non-RF input data in rendering such assessments. Further, the term "constituent content" refers to the degree or level to which the grain contains at least one constituent, whether moisture or a non-moisture constituent. Examples of non-moisture constituents include protein, cellulose, starch, or oil contained in the grain. Such constituent content levels or quantities will often be expressed as a volume or weight percentage, such as a protein, cellulose, starch, or oil percentage (%) by weight; however, other manners in expressing the fractional quantity of a particular constituent within the grain are equally viable.

As indicated above, embodiments of the RF grain mass and constituent measurement system may also consider non-RF sensor input and other non-RF input data in determining grain mass, moisture content, non-moisture constituent measurement(s), and other grain-related parameters, such as a grain mass flow rate or overall grain yield. The measurement system may recall from memory and apply pre-established conversion factors and equations where appropriate; e.g., as utilized in, for example, converting a measured grain volume (inferred from the below-described RF response signals) to grain mass. Clean grain elevator speed, or a similar parameter, may be considered when further converting grain mass to grain mass flow rate through the combine harvester. Operator input data may also be considered when pertinent, with such operator input potentially specifying a particular crop type or crop category currently processed by the combine harvester in embodiments.

The RF grain mass and constituent measurement systems can include any practical number of RF sensors (emitters, receivers, and other associated hardware), which collectively form an RF sensor subsystem. In certain embodiments, the RF sensor subsystem can include a single RF receiver and emitter pair, which cycles through multiple fixed frequencies during operation; or, instead, which modulates the emitted RF energy over a predetermined frequency range. In other instances, the RF sensor subsystem may contain two or more RF sensors, with each RF sensor operating at a unique frequency or frequency range within the RF domain. When including two or more RF sensors, the sensor subsystem can utilize real-time data to resolve multiple parameters pertaining to the harvested grain, while permitting continual, uninterrupted flow of the clean grain stream. Further, each RF sensor may be optimized to operate at a unique frequency or frequency range and tailored to maximize signal-to-noise ratio within its local structural environment; e.g., by customizing antenna shape and dimensions to best suit the region of the combine harvester into which the RF sensor is integrated. Each RF sensor is beneficially optimized to provide a sensor field-of-view (FOV) or interrogation area through which substantially all grain contained in the clean grain stream passes, while further minimizing structural interference from any RF-interactive (e.g., metal) components within the interrogation area.

In various implementations in which the sensor subsystem includes at least first and second RF sensors, a first RF sensor is positioned to capture RF sensor readings of the grain within the clean grain stream at a location in which the grain is relatively compact or aggregated into a consolidated mass; e.g., as when the grain is distributed into discrete piles supported by the paddles of the clean grain elevator. Additionally, in such implementations, the second RF sensor may be positioned to capture RF sensor readings of the clean grain when in a more dispersed distribution, as when airborne and discharged from the paddles through the outlet of the clean grain elevator. In this case, the second RF sensor may be imparted with a more expansive FOV or interrogation area than is the first RF sensor to ensure the substantial entirety of the grain discharged through outlet of the clean grain elevator is impinged by RF energy and captured by the corresponding RF sensor readings.

The frequencies at which the sensor or sensors within the RF sensor subsystem operate will vary between embodiments. The operational frequencies of the RF sensors can be tailored to best suit a particular sensor location or optimized to elicit a desired signal response providing greater resolution for discriminating between the RF characteristics stored in memory as "ground truth" testing data. Generally, the RF sensors will operate in the RF domain, which is defined herein to range from 3 hertz (Hz) to 3 terahertz (THz). In certain embodiments, the RF sensor(s) within the sensor subsystem will operate in the microwave band (herein, defined as ranging from 1 gigahertz (GHz) to 30 GHz) or the millimeter wave (MMW) band (herein, defined as ranging from 30 GHz to 300 GHz). A tradeoff is encountered as data resolution and grain parameter estimate accuracy tends to increase at higher frequencies (e.g., frequencies exceeding 1 GHz), while the cost and complexity of such sensor systems tends to increase at such higher frequencies. For these reasons, in at least some applications, a frequency or frequency range between 1 and 100 GHz is advantageously selected at which to operate each sensor. For example, in such embodiments, a first RF sensor may operate at a first fixed frequency or a maximum frequency (if emitting RF energy over a frequency range) of $f_1$, while a second sensor may operate at a second fixed frequency or a minimum frequency (if emitting RF energy over a frequency range) of $f_2$, with $f_2$ having a value at least twice that of $f_1$.

The RF grain mass and constituent measurement system further includes some form of processing architecture, which is generally referred to hereafter as a "controller." During system operation, the controller receives the RF sensor readings from the RF sensor subsystem and compares such readings to the information (testing data) stored in an RF characteristic database, which resides in a computer-readable memory onboard the combine harvester or otherwise accessible to the controller. As indicated above, the RF characteristic database contains RF characteristic testing data observed for tested grain samples over one or more tested frequency ranges. Such RF characteristic testing data is advantageously generated as a ground truth data by gathering RF signatures or signal response characteristics of a range of grain samples having known properties (e.g., known grain types, known masses or volume measurements, known moisture contents, and known constituent content measurements) over selected frequency ranges encompassing the frequencies at which the RF sensors operate. Such RF characteristic testing data can be stored in a memory accessible to the controller utilizing any suitable data structure, such as multidimensional lookup tables. This notwithstanding, the RF characteristic testing data is conveniently stored in memory as one or more RF signal response maps, which graphically plot RF signal characteristics of the tested grain samples over the tested frequency range(s). The traces of such maps may be stored as discrete plot points or, instead, stored in the form of a multi-variable equations or formulae when possible.

For increased versatility, such RF signal response maps may be generated for grains of various types, grain categories various moisture contents, or the like; and the appropriate RF signal response maps may be recalled by the controller when needed. For example, if determining that the currently-harvested grain is corn having a particular moisture content level (e.g., 16%, by weight), the controller may recall the RF signal response map (or RF characteristic dataset) for the tested corn samples having the specified moisture content; and then utilized the recalled RF signal response map to determine grain mass and a non-moisture constituent content, such as an oil content as set-forth in the example discussed below in connection with FIGS. 4 and 5.

As just indicated, when receiving the RF sensor readings from the RF sensors, the controller then determines grain mass, the moisture content, and/or a non-moisture constituent content of the currently-harvested grain based, at least in part, on a comparison between the RF sensor readings and RF characteristic testing data. In embodiments in which multiple RF sensor readings are captured at different frequencies or frequency ranges, this permits the controller to solve for multiple unknown parameters by cross-reference. Thus, utilizing such an approach, the controller may solve for grain volume (for subsequent conversion to grain mass), moisture content, and a first constituent content (e.g., protein, cellulose, starch, or oil content) measurement in embodiments. Additional constituent content levels can also be measured, as desired, by gathering additional RF sensor readings and utilizing an appropriate number of frequency correlation equations.

Multiple different RF properties can be observed and utilized in assessing grain characteristics or attributes. By way of non-limiting example, the following principally focuses on RF measurements observed as attenuation (decreases in the amplitude or magnitude of RF energy) and phase change (propagation delay of RF energy). Notably, with respect to phase change, in particular, this property can be readily measured in the RF domain, but is difficult, if not impractical to measure for grain assessment purposes when higher energy, ionization EM radiation (x-ray or gamma rays) are utilized. While the following description principally focuses on RF signal response measured in terms of RF energy attenuation and phase change, alternative embodiments of the RF grain mass and constituent measurement system may further consider other RF-related measurements including, but not limited to, polarization, power density distribution, reflection, and back-scattering. After determining the grain mass parameter and the grain constituent quantity estimate, the controller then commands one or more actions based upon the determined grain mass parameter and the grain constituent quantity estimate. Such actions may include any combination of: (i) display of the determined parameters (e.g., as a numerical readout or symbol) on a display device located within an operator cabin of the combine harvester, (ii) storing the determined parameters, as time-stamped data, within a memory accessible to the controller, (iii) offboarding the determined parameters to central control source or other remotely-located entity, and/or (iv) commanding an actuator onboard the combine harvester to adjust a component in a manner responsive to the newly-determined parameters.

By virtue of the above-described functions, embodiments of the RF grain mass and constituent measurement systems achieve multiple notable benefits over conventional sensor systems utilized to measure grain properties within combine harvesters. Real-time grain assessment is enabled by capturing RF signal response readings of the clean grain flow in-situ and without interruption in embodiments in which a first RF sensor captures a first RF signal response of the clean grain stream at an upstream location, while a second downstream RF sensor captures a second RF signal response of the clean grain stream at a downstream location, enabling measurements of essentially the same body of grain. Calibration demands are lessened or eliminated, while the accuracy of grain mass and grain moisture estimates may be maintained, if not enhanced as a result. Usage of sensors operating in the RF domain, and perhaps in the microwave or the MMW domain, avoids grain exposure to higher energy, ionizing EM radiation. Further, and as particularly useful benefit, information can now be gathered in real-time regarding the compositional make-up of grains processed by a combine harvester. For example, the percentage make-up of one or more constituents (e.g., protein, cellulose, starch, oil, or the like) contained within the grain can be determined, opening new possibilities for using such data in various manners.

The following will now describe examples of the RF grain mass and constituent measurement system in the context of an example combine harvester, as illustrated and discussed below in connection with FIGS. 1 and 2. Additionally, methods or processes that may be carried-out by the controller of the RF grain mass and constituent measurement system to determine multiple unknown parameters (grain mass, moisture content, and/or the grain composition of one or more non-moisture constituents) are further discussed below in conjunction with FIG. 3. Finally, examples of RF characteristic testing data that may be stored in the RF characteristic database as RF response maps are further set-forth below in connection with FIGS. 4 and 5. The following description is provided by way of non-limiting illustration only and should not be construed to unduly restrict the scope of the appended Claims in any manner.

Example Combine Harvester Equipped with Radio Frequency Grain Mass and Constituent Measurement System Referring to FIG. 1, an example combine harvester 10 equipped with an RF grain mass and constituent measurement system 12 is schematically depicted. The combine harvester 10 is presented by way of illustration to establish a non-limiting example context in which embodiments of the RF grain mass and constituent measurement system 12 may be better understood. In further embodiments, the combine harvester 10 may assume other forms and include different combinations of components suitable for processing crop plants ingested into the harvester 10 when traveling over a field 14. Further, only selected components of the RF grain mass and constituent measurement system 12, such as a controller 16, are shown in FIG. 1 for illustrative clarity. Further illustration and discussion of the example RF grain mass and constituent measurement system 12 is provided below in connection with FIG. 2.

The example combine harvester 10 includes a chassis body or main frame 18, which is supported by a number of ground-engaging wheels 20. The ground-engaging wheels 20 are powered by a non-illustrated engine and drivetrain including, for example, an electronically-controlled hydraulic transmission. Atop a forward portion of the main frame 18, a cabin 22 encloses an operator station including an operator's seat (not shown), at least one display device 24, and an operator interface 26. A feederhouse 28 is mounted to a forward portion of the main frame 18 of the combine harvester 10 at an elevation generally below the cabin 22. Various harvesting heads or, more simply, "headers" are attachable to the feederhouse 28 in an interchangeable manner to, for example, allow customization of the combine harvester 10 for harvesting a particular type of crop. An example of one such header, here a harvesting platform 30, is shown in FIG. 1.

As the combine harvester 10 travels over the field 14 in a forward direction, the harvesting platform 30 gathers severed crop plants into the feederhouse 28, which then consolidates the severed crop plants for conveyance (e.g., via a non-illustrated conveyor belt contained in the feederhouse 28) into the interior of the combine harvester 10. Within the combine harvester 10, the crop plants are engaged by a rotating drum conveyor or "beater" 32, which directs the crop plants in a generally upward direction into a rotary threshing and separating section 34. The rotary threshing and separating section 34 can include various components for performing the desired functions of separating the grain and chaff from other plant material. The illustrated rotary threshing and separating section 34, for example, includes a rotor or drum 36 having threshing features and rotatably mounted in a case or rotor housing 38. Rotation of the threshing drum 36 within the rotor housing 38 causes both grain and chaff to fall through the separation grates of a concave 40 and into the inlet of a lower grain cleaning section 42. Concurrently, straw and similar MOG is directed toward an outlet end 44 of the rotary threshing and separating section 34 and is ultimately delivered to another rotating drum or "discharge beater" 46 for expulsion from an aft end of the combine harvester 10.

Discussing now the grain cleaning section 42 in greater detail, this section of the combine harvester 10 includes various components adapted to clean the newly-harvested grain, while separating the chaff therefrom. Such components may include a chaffer 48, a sieve 50, and any number of fans (not shown). By action of the grain cleaning section 42, the newly-cleaned grain is directed into a clean grain elevator 52 for conveyance upwardly into a storage reservoir or clean grain tank 53 of the combine harvester 10. The path traveled by the clean grain from the grain cleaning section 42 to the clean grain tank 53 is referred to herein as a "clean grain flow path," while the grain traveling along this flow path is generally referred to as a "clean grain stream." A number of RF sensors 54, 56, which are included in the RF grain mass and constituent measurement system 12, may be positioned at different locations along the clean grain flow path. For example, the RF sensors 54, 56 may be strategically positioned to capture RF sensor readings of the grain when conveyed through the clean grain elevator 52, as generically indicated in FIG. 1 by the placement of the circular symbols representative of the RF sensors 54, 56. The RF sensors 54, 56 gather RF sensor readings of the newly-harvested grain as the grain is transported into the clean grain tank 53. Such RF sensor readings are then utilized by controller 16 is estimating or calculating grain mass and one or more constituent content levels of the grain, as further discussed below in connection with FIG. 3.

As the clean grain elevator 52 transports the newly-harvested grain into the clean grain tank 53, tailings fall onto a return elevator 58 extending across a lower portion of the clean grain elevator 52. The return elevator 58 then recycles the tailings back to the inlet of the thrashing drum 36 for further threshing to allow the above-described grain processing steps to repeat and maximize the grain yield of the combine harvester 10. In this manner, the combine harvester 10 effectively intakes severed crop plants from the field 14, extracts grain from the crop plants, cleans the newly-extracted grain, and then stores the grain in clean grain tank 53 for subsequent unloading utilizing, for example, an unloading auger 60. Also, during usage of the combine harvester 10, certain components within the combine harvester 10 may be positionally adjusted or the operating parameters of such components may be modified utilizing any number of actuators 62, such as hydraulic- or electrically-controlled linear or rotary actuators, one of which is generically represented by symbol 62 in FIG. 1. In this regard, the operational speeds of any number of fans or conveyor belts may be varied, as may the position of any number of non-illustrated deflectors, chaffer components, sieve components, or the like. Such actuators 62 may be controlled in response to operator input received via the operator interface 26 located within the cabin 22, controlled via command signals issued by the controller 16 included in the RF grain mass and constituent measurement system 12, or otherwise commanded by another controller or control unit onboard the combine harvester 10.

Figure 2:
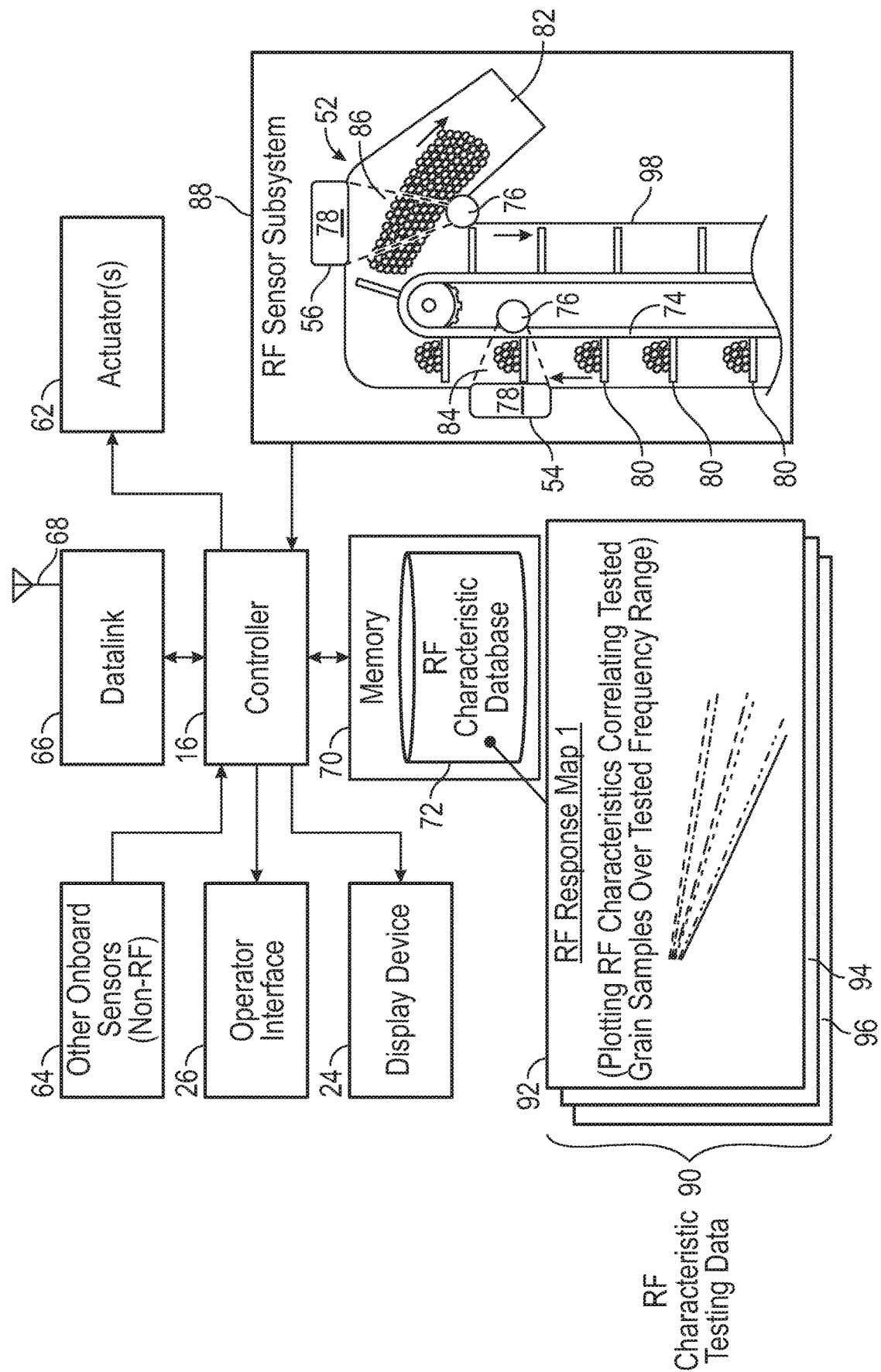
FIG. 2 schematically illustrates additional components that may be included in embodiments of the example RF grain and mass constituent measurement system.

Referring now to FIG. 2, the RF grain mass and constituent measurement system 12 is shown in greater detail, as is an upper section of the clean grain elevator 52. Reference numerals are carried-over from FIG. 1, where appropriate. Note, for example, the inclusion of boxes representative of the controller 16, the display device 24, the operator interface 26, and the RF sensors 54, 56, in the schematic of FIG. 2. In addition to the foregoing components, the RF grain mass and constituent measurement system 12 may further include any number of additional non-RF sensors 64 integrated into the combine harvester 10, a wireless datalink 66 having an antenna 68, and a computer-readable memory 70 storing an RF characteristics database 72. The various data connections between these components are represented in FIG. 2 by a number of signal lines terminating in arrowheads, with such signal lines generally representative of any combination of wired or wireless data connections.

The controller 16 of the RF grain mass and constituent measurement system 12 can assume any form suitable for performing the functions described throughout this document. The term "controller," as appearing herein, is utilized in a non-limiting sense to generally refer to the processing architecture of RF grain mass and constituent measurement system 12. The controller 16 can encompass or may be associated with any practical number of processors, control computers, computer-readable memories, power supplies, storage devices, interface cards, and other standardized components. The controller 16 may also include or cooperate with any number of firmware and software programs or computer-readable instructions designed to carry-out the various process tasks, calculations, and control/display functions described herein. Such computer-readable instructions may be stored within a non-volatile sector of the memory 70 along with the below-described RF characteristic database 72. While generically illustrated in FIG. 2 as a single block, the memory 70 can encompass any number and type of storage media suitable for storing computer-readable code or instructions, as well as other data utilized to support the operation of the RF grain mass and constituent measurement system 12. The memory 70 may be integrated into the controller 16 in embodiments as, for example, a system-in-package, a system-on-a-chip, or another type of microelectronic package or module.

The operator interface 26 located within the cabin 22 can be any device or group of devices utilized by an operator to input commands into or otherwise control the RF grain mass and constituent measurement system 12. In various implementations, the operator interface 26 may be integrated into or otherwise associated with the display device 24. In this regard, the operator interface 26 may include physical inputs (e.g. buttons, switches, dials, or the like) located on or proximate the display device 24, a touchscreen module integrated into the display device 24, or a cursor input device (e.g., a joystick, trackball, or mouse) for positioning a cursor utilized to interface with GUI elements generated on the display device 24. Comparatively, the display device 24 can be any image-generating device configured for operation within the cabin 22 of the combine harvester 10. The display device 24 may be affixed to the static structure of the cabin 22 and realized in a head-down display (HDD) configuration in embodiments.

When included in the RF grain mass and constituent measurement system 12, the wireless datalink 66 may assume the form of an RF transceiver permitting wireless data transmission and reception with a remotely-located control center or data source. In various implementations, the datalink 66 can receive information utilized in evaluating crop or soil conditions, weather conditions, and perhaps in periodically updating or refining RF characteristic database 72. Additionally or alternatively, the datalink 66 may be utilized to offboard (that is, transmit to a remotely-located source) data gathered by the controller 16, with the remote source then aggregating the data or other utilizing the data in some manner. In other embodiments, the datalink 66 may be omitted from the RF grain mass and constituent measurement system 12, as may many of the other components shown in FIG. 2.

Lastly, the non-RF sensors 64 may include various sensors providing input data utilized by the controller 16 in assessing one or more parameters pertaining to the currently-harvested grain processed by the combine harvester 10. Such sensors 64 can include, for example, sensors for measuring the speed of the clean grain elevator 52 (as useful in determining mass flow rate) and/or sensors for detecting grain type (useful in filtering the RF characteristic testing data 90 to isolate pertinent RF characteristics in performing the below-described functions to determine grain mass and constituent levels). Additionally, the possibility that the non-RF sensors 64 may include capacitance sensors, weight sensors, or other such sensors utilized to estimate grain moisture content is not precluded. When such sensors are present, the data input provided by the sensors may be utilized to determine moisture content independently of or in combination with RF signal response signals collected by the RF sensors 54, 56, as further described below. In other instances, moisture content may be determined solely utilizing the RF signal response signals provided by the RF sensors 54, 56; or determined in another manner, such as by operator input received via operator interface 26.

Discussing RF sensors 54, 56 in greater detail, the RF sensors 54, 56 each include at least one RF emitter 76 and at least one RF receiver 78. As indicated above, the RF sensors 54, 56 are usefully disposed at different locations along the clean grain flow path; although one or both of the RF sensors 54, 56 can be potentially positioned to capture RF sensor readings of the harvested grain outside of the clean grain flow path in alternative embodiments. In various implementations, and as indicated on the right of FIG. 2, the RF sensors 54, 56 are integrated into the structure of the clean grain elevator 52. Specifically, the RF sensor 54 may be strategically positioned to capture RF sensor readings of the harvested grain when transported upwardly within the clean grain elevator as piles or consolidated masses supported by the grain elevator paddles 80 (only a few of which are labeled in FIG. 2) projected from a conveyor belt 74 contained in the clean grain elevator 52. Comparatively, the RF sensor 56 may be positioned to capture the harvested grain as the grain is thrown from the paddles 80 and thus discharged through an outlet 82 of the clean grain elevator 52. Accordingly, in such embodiments, the interrogation area or FOV 84 of the RF sensor 56 may be enlarged relative to the interrogation area or FOV 86 of RF sensor 54 to ensure that the RF sensor 56 records the signal response of substantially all of the airborne grain passed through the outlet section 82 of the clean grain elevator 52. This may be accomplished by tailoring the respective antennae shapes and dimensions of the emitter 76 and receiver 78. In still other embodiments, the RF sensors 54, 56 may be positioned at the same location or essentially the same location within the clean grain elevator 52; e.g., the sensors 54, 56 may be co-located to capture RF sensor readings of the grain when supported by a paddle 80 of the clean grain elevator 52 or co-located to capture RF sensor readings of the grain when discharged from the clean grain elevator 52 through outlet 82. Collectively, the RF sensors 54, 56 included in the RF grain mass and constituent measurement system 12 form an RF sensor subsystem 88.

In embodiments, the RF sensors 54, 56 concurrently capture RF sensor readings of the currently-harvested grain, while transported along the clean grain flow path. Further, the RF sensor 54 is configured to capture RF sensor readings of the currently-harvested grain at a first frequency or frequency range. Comparatively, RF sensor configured to capture RF sensor readings of the currently-harvested grain at a second frequency or frequency range different than the first frequency or frequency range. The sensors 54, 56 can operate in either or both of a transmit and a reflected mode. In embodiments, the first frequency or frequency range and the second frequency or frequency range each have values ranging between 1 and 300 GHz or, perhaps, between 1 and 100 GHz, while the first frequency or frequency range differs relative to (is greater than or less than) the second frequency or frequency range. Additionally or alternatively, the RF sensors 54, 56 may each be configured to capture RF sensor readings of the grain when subjected to or impinged with RF energy falling within the microwave and/or MMW bands. For example, in such embodiments, a first RF sensor may operate at a first fixed frequency or a maximum frequency (if emitting RF energy over a frequency range) of $f_1$, while a second sensor may operate at a second fixed frequency or a minimum frequency (if emitting RF energy over a frequency range) of $f_2$. Further the value of $f_2$ may be at least twice that of $f_1$ such that the following equation applies: $1\ GHz < f_1 \leq 2f_2 < 100\ GHz$. The frequencies at which the RF sensors 54, 56 operate will vary among embodiments, as will the sensor positioning; generally, however, the sensor frequencies and positioning are selected to maximize signal-to-noise ratios, avoid structural (e.g., metallic) interface, and elicit distinct signal responses from the grain to optimize resolution when distinguishing between the RF characteristics stored in RF characteristic database 72, as further discussed below in connection with FIGS. 3-5.

The RF sensor readings captured by the RF sensors 54, 56 are provided over wired or wireless data connections to the controller 16. The controller 16 then considers the RF sensor readings provided by the RF sensors 54, 56 in conjunction with data contained within the RF characteristic database 72 in assessing unknown parameters pertaining to the grain processed by the combine harvester 10. Specifically, the RF characteristic database 72 contains RF characteristic testing data 90 observed for tested grain samples having known properties, while the grain samples are impinged with RF energy over one or more tested frequency ranges. An "RF signal response" can be any RF signal measurement captured when impinging RF energy against a harvested grain, whether the RF energy is passed through or reflected from the grain. The RF signal response may be, for example, a measurement of: (i) the attenuation of RF energy when passed through the harvested grain; or (ii) the propagation delay (phase shift) of RF energy when passed through the harvested grain. In further implementations, other types of RF signal responses may be considered in addition to or in lieu of the attenuation and/or propagation delay of RF energy impinged against the harvested grain. A non-exhaustive list of such alternative RF signal responses that may be considered by the controller 16 includes polarization, power density distribution, reflection, and back scattering. The controller 16 utilizes such RF sensor readings to determine mass and one or more constituent quantities (e.g., moisture content and/or one or more non-moisture content percentages) of the harvested grain based, at least in part, on a comparative analysis with the RF characteristic testing data 90 stored in the database 72.

The RF characteristic testing data 90 may be stored as one or more RF signal response maps 92, 94, 96, as generally indicated in the lower left of FIG. 2. Alternatively, the RF characteristics may be stored utilizing another data structure, such as a multidimensional lookup table. When stored in one or more response maps 92, 94, 96, the RF characteristics may be plotted as traces, lines, or curves on a two-dimensional graph of frequency range versus measured RF signal response parameter. Such traces can be stored as series of discrete, connected points or coordinates; or stored in the form of formulae when possible. Examples of such RF signal response maps are discussed more fully below in connection with FIGS. 4 and 5. The RF characteristic database 72 may store a plurality of such maps associated with or corresponding to different grain types, with controller 16 then selecting the appropriate response map or maps (e.g., the response map 92 shown in the foreground in FIG. 2) based upon the type or category of grain currently processed by the combine harvester 10. Subsequently, the controller 16 may determine or estimate the grain mass, the moisture content, and/or a first constituent content of the currently-harvested grain based, at least in part, on matching the RF sensor readings with a specific RF signal response included in the RF signal responses plotted on the RF signal response map 92. The manner in which the controller 16 may perform such function will now be described in more detail in connection with FIG. 3.

Figure 3:
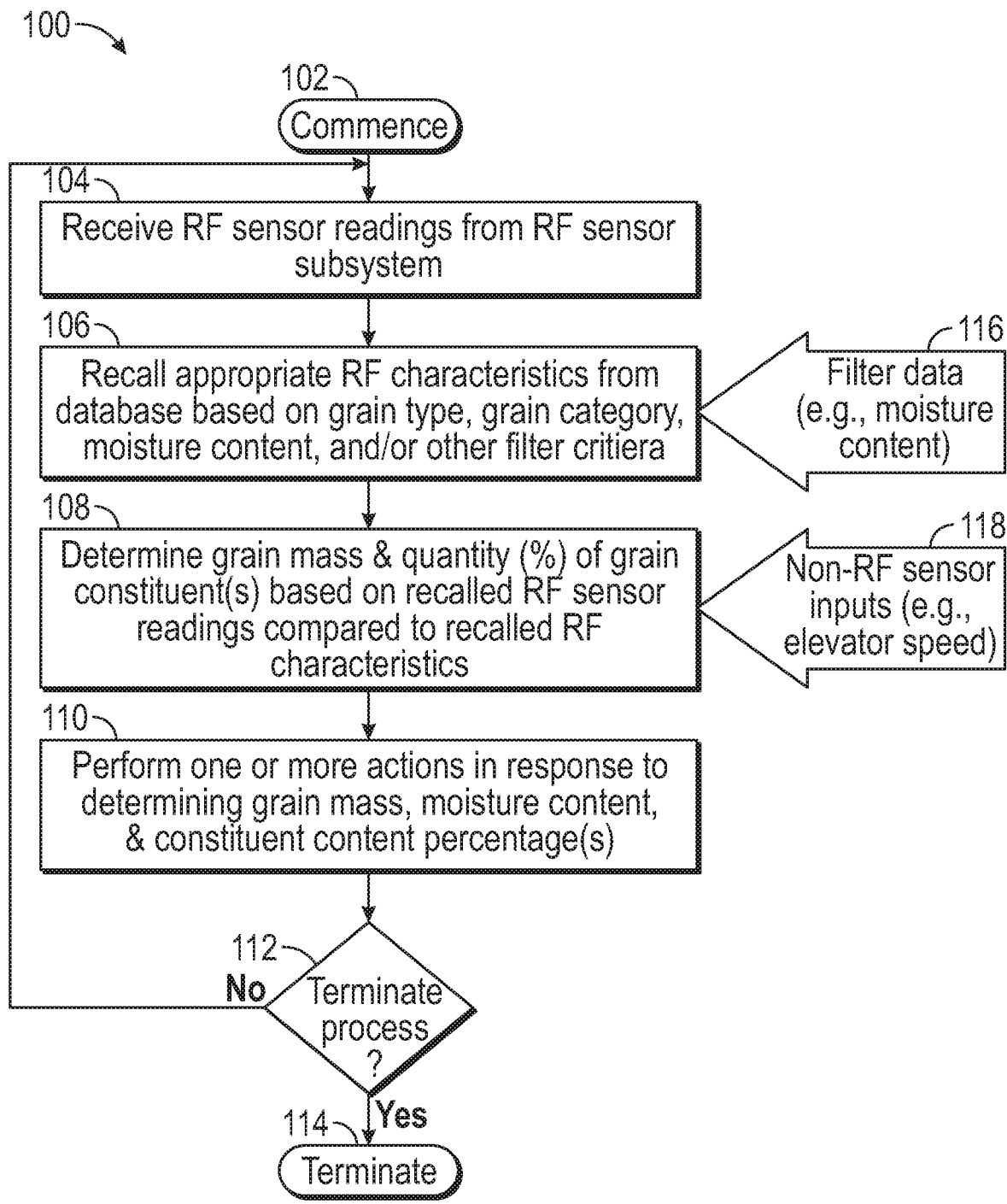
FIG. 3 is a flowchart of an example process suitably carried-out by a controller of the RF grain and mass constituent measurement system (FIGS. 1 and 2) to determine multiple parameters (e.g., grain mass, moisture content, and/or constituent content levels) of a grain processed by the combine harvester shown in FIG. 1.

Referring now to FIG. 3, an RF grain mass and constituent measurement process 100 is presented in accordance with a non-limiting example embodiment. The RF grain mass and constituent measurement process 100 can be carried-out by the controller 16 of the RF grain mass and constituent measurement system 12 in embodiments of the present disclosure. The RF grain mass and constituent measurement process 100 includes a number of process STEPS 102, 104, 106, 108, 110, 112, 114, each of which is described, in turn, below. Depending upon the particular manner in which the RF grain mass and constituent measurement process 100 is implemented, each step generically illustrated in FIG. 4 may entail a single process or multiple sub-processes. Further, the steps illustrated in FIG. 3 and described below are provided by way of non-limiting example only. In alternative embodiments of the RF grain mass and constituent measurement process 100, additional process steps may be performed, certain steps may be omitted, and/or the illustrated process steps may be performed in alternative sequences.

The RF grain mass and constituent measurement process 100 commences at STEP 102 in response to the occurrence of a predetermined trigger event. In certain instances, the trigger event may be detection of the intake of severed crop plants into the combine harvester 10 (FIG. 1). In other instances, the RF grain mass and constituent measurement process 100 may be commence in response to a different trigger event, such as in response to operator input received via operator interface 26 indicating that the RF grain mass and constituent measurement process 100 is desirably performed.

After commencing (STEP 102), the RF grain mass and constituent measurement process 100 advances to STEP 104. At STEP 104, the controller 16 receives RF sensor readings from RF sensor subsystem 88 (FIG. 2). In the illustrated example, specifically, the controller 16 receives RF sensor readings from RF sensors 54, 56 positioned in the clean grain elevator 52 during STEP 104. Next (or concurrent with or prior to STEP 104), the controller 16 recalls appropriate RF characteristics from the RF characteristic database 72 (FIG. 2). As indicated in FIG. 3 by arrow 116, controller 16 may determine the pertinent RF characteristics for recollection and subsequent consideration utilizing various types of filter criteria. Generally, in embodiments, the RF characteristic database 72 may contain multiple datasets of RF characteristics, with each dataset corresponding to a particular type of grain or a particular grain category. In such embodiments, the controller 16 may identify the particular grain type or grain category presently processed by the combine harvester 10; e.g., based upon operator input received via operator interface 26, based on GPS data if correlated to grain type, and/or based on any type of automated grain identification technique, such as image processing of a live camera feed or surface response measurements of the harvested grain. Examples of grain types include, but are not limited to, corn, canola, soybeans, wheat, oats, and sunflowers. Grain categories may be differentiated by general grain compositions, such as protein- or oil-rich grains. The controller 16 may then extract the appropriate RF characteristics from the database 72 tagged or linked to the presently-processed grain type or category. A similar approach can also be utilized to filter by moisture content after a moisture content has been estimated by the controller 16, as described below. In other embodiments, other filter criteria can be utilized; or the controller 16 may simply compare all RF characteristics stored in the database 72 to the RF sensor readings during subsequently-performed STEP 108.

Next, at STEP 108 of process 100 (FIG. 3), the controller 16 determines multiple unknown parameters describing the currently-processed grain harvested by the combine harvester 10. In various embodiments, such parameters will include grain mass and the fraction of the harvested grain composed of a particular constituent type or types; e.g., protein, cellulose, starch, or oil content. The controller 16 also usefully estimates moisture content of the harvested grain during or prior to STEP 108 and then compensates for the moisture content estimate in determining grain mass and constituent content level(s) for increased accuracy. In embodiments, the controller 16 may utilize the RF sensor readings provided by RF sensors 54, 56 to estimate moisture content; e.g., by comparing the RF sensor readings 54, 56 to the recalled RF characteristics for tested grain samples having known moisture contents of varying levels. Further discussion in this regard is provided below in connection with FIG. 4. In other instances, moisture content may be determined in another manner; or any such moisture content estimate rendered utilizing the RF sensor data may be blended with other moisture content estimates, if available. Generally, then, various types of non-RF sensor data input 118 may be considered by the controller 16 during STEP 108, as indicated by arrow 118. In instances in which such data 118 includes operator input indicative of moisture content, weight or capacitance measurements indicative of moisture content, or other such information indicative of moisture content, this data may alternatively be utilized to determine moisture content or otherwise considered during STEP 108.

The RF sensor readings are compared to the recalled RF characteristics to estimate grain mass and one or more constituent quantities within the harvested grain. The controller 16 may identify a particular characteristic based upon the RF sensor readings to determine unknown parameters (grain mass and grain attribute(s)), noting that the usage of multiple RF sensor readings captured at different frequencies or frequency ranges enables multiple unknown parameters to be discerned utilizing cross-reference techniques. Stated differently, the controller 16 may analyze the RF sensor readings utilizing the recalled RF characteristic or correlation equations (as established by the testing data); e.g., top-bottom and in-out measurements can be utilized to device multiple variables for the constituents in embodiments. With respect to grain mass, in particular, the RF sensor readings may be utilized to initially determine a volume of grain as the grain passes through a given sensor interrogation area. This may be expressed as, for example, a grain pile depth in the case of RF sensor 54 shown in FIG. 2, which can then be converted to a volumetric measurement as the width and length of the grain pile is generally known (determined by the configured space between the grain elevator housing 98, the paddles 80, and the conveyor belt 74). The grain volume of each grain pile can then be converted to mass (e.g., number of grams) utilizing a known conversion factor, which may then be converted to grain mass flow rate and crop yield by considering the speed of the clean grain elevator 52 (further included in the non-RF sensor inputs 118) and other such factors.

After determining grain mass, moisture content, and the constituent content(s) of the currently-harvested grain (STEP 108), the controller 16 progresses to STEP 110 and performs any number of actions. Such actions may include any combination of the following: (i) displaying such information on the display device 24 for reference by an operator; (ii) stored such information in memory 70 to create, for example, a time-stamped data log for subsequent reference or analysis; (iii) offboarding such information to another entity or system via the datalink 66; or (iv) commanding actuator(s) 62 to adjust an operating parameter or component position in response to changes in the grain mass flow rate, moisture content, or other grain-related parameter. Following STEP 110, the controller 16 determines whether the RF grain mass and constituent measurement process 100 should terminate (STEP 112) due to, for example, deactivation by an operator or cessation of crop harvesting by the combine harvester 10. If determining that the RF grain mass and constituent measurement process 100 should terminate, the controller 16 progresses to STEP 114 and terminates the process 100 accordingly. Otherwise, the controller 16 returns to STEP 104 and performs a further iteration of the RF grain mass and constituent measurement process 100, as previously described. Such steps may be performed on a relatively rapid basis to allow the RF grain mass and constituent measurement system 12 to measure grain mass and constituent levels (moisture content and/or non-moisture content level(s)) in highly responsive, real-time manner.

Figure 4:
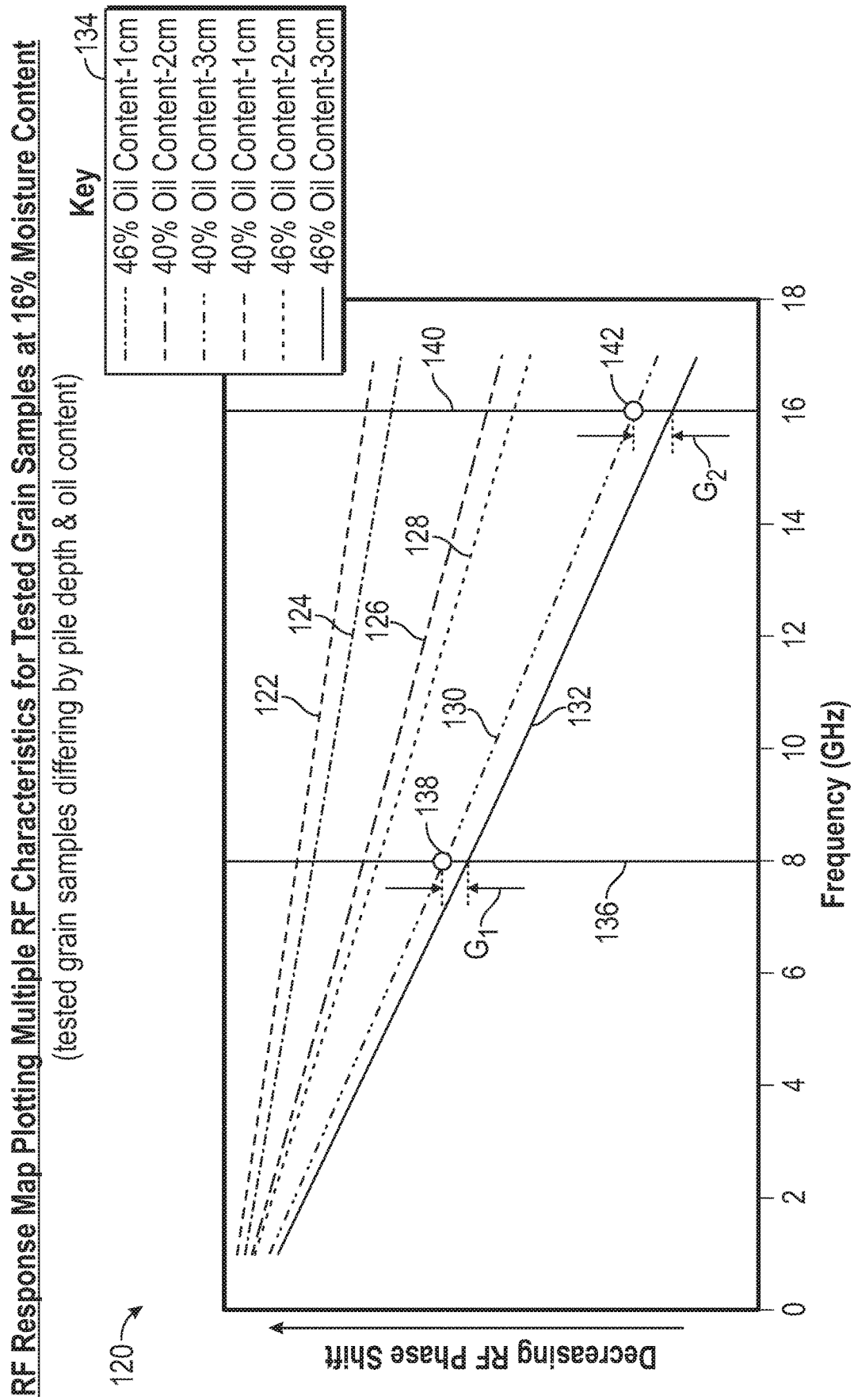
FIG. 4 graphically plots RF characteristics (here, expressed in terms of phase shift) over a tested frequency range for a number of tested grain samples, which may be utilized by the controller in determining grain mass and a first constituent content (here, oil content) in embodiments.
Figure 5:
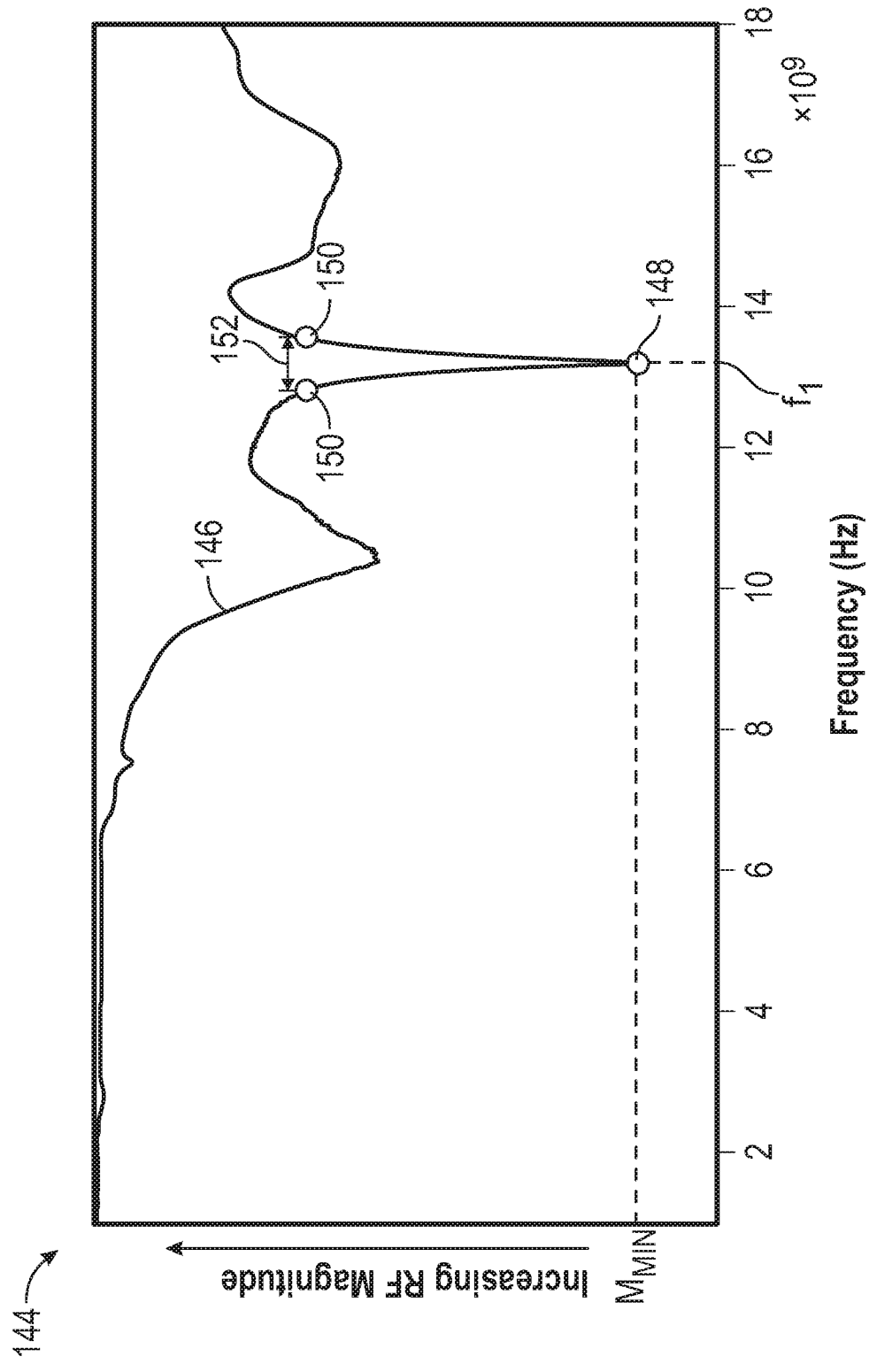
FIG. 5 graphically illustrates an RF sensor reading (here, measured in terms of wave amplitude or magnitude) of a tested grain sample over a predetermined frequency range, which may further be utilized by the controller in determining grain mass and a first constituent content of a harvested grain in embodiments.

FIG. 4 presents an example RF response map 120 plotting several RF signal response characteristics 122, 124, 126, 128, 130, 132 over a tested frequency range for a number of tested grain samples. Specifically, in the illustrated example, each of the tested grain samples corresponding to the RF characteristics 122, 124, 126, 128, 130, 132 have a known moisture content of 16%, by weight. In addition to a known moisture content, the tested grain samples also include known oil content levels and pile depths in the illustrated example, as indicated by a key 134. In the case of RF response map 120, the RF signal response under consideration is the propagation delay or phase shift of RF energy when impinged against (e.g., passed through) the tested grain samples. Various other RF response characteristics for tested grain samples having 16% moisture content, varying oil levels, and/or varying pile depths may also be plotted on the example RF response map 120 in embodiments, but are not shown in FIG. 4 for visual clarity.

Referring to FIGS. 1-3 in combination with FIG. 4, the controller 16 may estimate moisture content of the currently-harvested grain during STEP 106 of the RF grain mass and constituent measurement process 100 (FIG. 3) in embodiments. Again, the controller 16 may determine moisture content in any suitable manner, but usefully does so utilizing multiple correlations established by the stored testing data and multiple sensor readings captured by the RF sensors 54, 56. For example, the RF signal response characteristics 122, 124, 126, 128, 130, 132 plotted by the RF response map 120 for tested grain sample having an established moisture content level may be considered in conjunction with multiple other plotted RF signal response characteristics 122 (or correlation equations) having other established moisture content levels. The current RF sensor readings, as captured for different frequencies or frequency ranges, may then be utilized to identify the moisture content level by geometric or pattern matching to a particular characteristic or range of candidate characteristic. The determined moisture level may then be utilized to select the RF response map 120 for usage in evaluating the pile depth and the oil content level of the currently-processed grain. For example, in an embodiment in which an RF sensor reading is captured at a frequency of 8 GHz (as indicated in FIG. 4 by a vertical line 136), a detected phase shift (unit-less in FIG. 4, but suitably expressed in degrees) may correspond to a marker 138. As the marker 138 falls on or adjacent the characteristic 130, it can be determined that currently-harvested gran has a pile depth of 2 centimeters (cm) and an oil content level of approximately 46% by weight. Once determined, the pile depth can be converted into volume for usage in determining grain mass. A similar approach can also be utilized to determine the other constituent content levels of the currently-harvested grain, as permitted by the RF sensing readings and the RF characteristic testing data stored in the database 72.

In the above-described example, a fixed testing frequency of 8 GHz was discussed. Referring further to FIG. 4, vertical line 140 further denotes a testing frequency of 16 GHz, with marker 142 indicating a hypothetical phase shift value taken along the characteristic or trace 130 that may be detected in an alternative practice scenario. Thus, in either case, the RF sensor readings indicate that the currently-harvested grain has a pile depth of 2 cm (as divided into a discrete pile supported by one of the paddles 80 of the clean grain elevator 52) and an oil content of approximately 46%, by weight. However, as may be appreciate by comparing the vertical spacing between the characteristic 130 and the next closest characteristic 132 (identified as "$G_1$" for 8 GHz and "$G_2$" for 16 GHz in FIG. 4, "G" denoting "gap"), the separation or resolution between characteristics increases with increasing frequency. Considering this, there is a general benefit to impart the RF sensors 54, 56 with operational frequencies or frequency ranges that are higher to enhance resolution and accuracy. Concurrently, however, the cost and complexity of RF sensors tends to also increase at higher frequencies falling with the RF domain. For these reasons, in at least some applications, the RF sensors 54, 56 each operate at distinct frequencies or frequencies ranges between 1 and 100 GHz in embodiments. In other embodiments, however, one or both of the RF sensors 54, 56 may operate outside of the aforementioned range, providing that sensors 54, 56 operate within the RF domain.

In the example of FIG. 4, an RF sensor reading captured at a single fixed RF frequency or fixed RF frequencies is considered. In further embodiments, RF sensor 54 and/or RF sensor 56 may capture RF sensor readings over a predetermined frequency range and, thus, generate an RF response signature for the currently-harvested grain. The controller 16 may then geometrically match (e.g., utilizing a pattern matching image analysis algorithm) the sensor-detected RF signature to a corresponding RF signature or characteristic contained in the RF characteristic database 72. An example of such an RF response characteristic 146 is plotted in an RF response map 144 shown in FIG. 5. In the map 144, detected changes in RF wave magnitude or amplitude (and thus attenuation) is charted on the vertical axis, while frequency is charted on the horizontal axis. While the magnitude axis is unit-less in the illustrated example (though the magnitude increase may be logarithmic), decibels or a similar unit may be utilized in actual implementations. Further, in other embodiments, a different RF response (e.g., phase shift, back scattering, polarization, reflection, power distribution, or a combination thereof) can be charted in a similar manner. Distinct geometric features that may be utilized for comparative analysis include a nadir occurring at a particular minimum magnitude ($M_{MIN}$) and a corresponding frequency ($f_1$), as identified by marker 148. Additionally, pronounced changes in slope (as indicated by markers 150) on either side of the nadir marker 148 may be considered by location or by spacing in the frequency dimension (as indicated by double-headed arrow 152). Thus, by matching such a sensor reading with a similar, if not identical RF characteristic or signature contained within the RF characteristic database 72, the controller 16 may identify the currently-harvested grain as sharing the same properties (e.g., pile depth, moisture content, and/or consistent content level) as does the tested grain sample corresponding to the identified RF characteristic or signature 146.

Through the above-described comparative analysis of the RF sensor readings with the testing data stored in the RF characteristic database 72, grain mass and grain constituent measurements can be determined by the RF grain mass and constituent measurement system 12 in a highly accurate and responsive manner. Further, such grain parameters can be determined in real-time or near real-time, while minimizing calibration requirements through the usage of ground truth data as consolidated into the reference models or characteristics stored as RF characteristic testing data. The foregoing process steps are presented by way of illustration only and should be considered non-limiting, noting that other processing techniques may be employed in further embodiments enabling grain mass and grain attributes (moisture and/or non-moisture content levels) to be determined by comparative analysis of RF sensor readings to "ground truth" or testing data stored in an RF characteristic database located onboard the combine harvester or otherwise accessible to the controller 16 of the RF grain mass and constituent measurement system 12.

Enumerated Examples of the Radio Frequency Grain Mass and Constituent Measurement System The following examples of the RF grain mass and constituent measurement system are further provided and numbered for ease of reference.

1. In a first example embodiment, an RF grain mass and constituent measurement system utilized onboard a combine harvester includes an RF sensor subsystem configured to capture RF sensor readings of a harvested grain within an area of the combine harvester containing the currently-harvested grain. A memory stores an RF characteristic database, which contains RF characteristic testing data observed for tested grain samples over one or more tested frequency ranges. A controller, operably coupled to the RF sensor subsystem and to the memory, is configured to: (i) receive the RF sensor readings from the RF sensor subsystem; (ii) determine grain mass and a first constituent content of the currently-harvested grain based, at least in part, on the RF sensor readings as compared to the RF characteristic testing data; and (iii) perform at least one action, including display or storing values associated with, or adjusting a component of the combine harvester, in response to determining the grain mass and the first constituent content of the currently-harvested grain.

2. The RF grain mass and constituent measurement system of example 1, wherein the RF sensor subsystem includes a first RF sensor and a second RF sensor. The first RF sensor configured to capture RF sensor readings of the currently-harvested grain at a first frequency or frequency range. The second RF sensor configured to capture RF sensor readings of the currently-harvested grain at a second frequency or frequency range different than the first frequency or frequency range.

3. The RF grain mass and constituent measurement system of example 2, wherein the first frequency or frequency range is between 1 and 300 GHz. The second frequency or frequency range is likewise between 1 and 300 GHz, while being different than the first frequency or frequency range.

4. The RF grain mass and constituent measurement system of example 2, wherein the combine harvester includes a clean grain flow path extending from a grain cleaning section to a grain storage tank. The first RF sensor is positioned to capture RF sensor readings of the currently-harvested grain at a first location along the clean grain flow path, while the second RF sensor is positioned to capture RF sensor readings of the currently-harvested grain at a second location along the clean grain flow path downstream of the first location.

5. The RF grain mass and constituent measurement system of example 4, wherein the first RF sensor and second RF sensor capture concurrent RF sensor readings of the currently-harvested grain without removal of the currently-harvested grain from the clean grain flow path.

6. The RF grain mass and constituent measurement system of example 4, wherein the combine harvester includes a clean grain elevator through which the clean grain flow path extends. The first RF sensor is positioned to capture RF sensor readings of the currently-harvested grain when supported by a paddle of the clean grain elevator, while the second RF sensor is positioned to capture RF sensor readings of the currently-harvested grain when discharged through an outlet of the clean grain elevator.

7. The RF grain mass and constituent measurement system of claim 1, wherein the controller is further configured to: (i) recall, from RF characteristic testing data, RF characteristics for tested grain samples having varying moisture contents; and (ii) estimate a moisture content of the currently-harvested grain based, at least in part, on the moisture content of at least one the RF characteristics identified as corresponding to the RF sensor readings.

8. The RF grain mass and constituent measurement system of example 1, wherein the first constituent content of the currently-harvested grain, as determined by the controller, is selected from the group consisting of an oil content, a protein content, a cellulose content, and a starch content.

9. The RF grain mass and constituent measurement system of example 1, wherein at least a subset of the RF sensor readings captured by the RF sensor subsystem measure a phase shift of RF energy when impinged against the currently-harvested grain. Further, the RF characteristic testing data includes testing data correlating observed RF energy phase shift over a tested frequency range.

10. The RF grain mass and constituent measurement system of example 1, wherein at least a subset of the RF sensor readings captured by the RF sensor subsystem measure attenuation of RF energy when impinged against the currently-harvested grain. Further, the RF characteristic testing data includes testing data correlating observed RF energy attenuation over a tested frequency range.

11. The RF grain mass and constituent measurement system of example 1, wherein the RF characteristic testing data includes at least one RF signal response map plotting RF signal responses of the tested grain samples over a tested frequency range.

12. The RF grain mass and constituent measurement system of example 11, wherein the RF sensor subsystem includes a first RF sensor is configured to capture RF sensor readings of the currently-harvested grain over a frequency range overlapping with the tested frequency range. Further, the controller is configured to determine the grain mass and the first constituent content of the currently-harvested grain based, at least in part, on matching the RF sensor readings with a specific RF signal response included in the RF signal responses plotted on the RF signal response map.

13. The RF grain mass and constituent measurement system of example 1, wherein the controller is further configured to: (i) identify a grain type of the currently-harvested grain; (ii) recall selected RF characteristics from the RF characteristic database corresponding to the identified grain type; and (iii) utilize the selected RF characteristics in determining the grain mass and the constituent content of the currently-harvested grain.

14. The RF grain mass and constituent measurement system of example 1, wherein the controller is further configured to: (i) estimate a moisture content of the currently-harvested grain; (ii) recall selected RF characteristics from the RF characteristic database corresponding to the estimated moisture content; and (iii) utilize the selected RF characteristics in determining the grain mass and the constituent content of the currently-harvested grain.

15. In further embodiments, RF grain mass and constituent measurement system includes an RF sensor subsystem, a memory storing an RF characteristic database, and a controller operably coupled to the RF sensor subsystem and to the memory. The RF sensor subsystem includes, in turn, first and second RF sensors. The first RF sensor is configured to capture RF sensor readings of the currently-harvested grain at a first frequency or frequency range. Comparatively, the second RF sensor is configured to capture RF sensor readings of the currently-harvested grain at a second frequency or frequency range different than the first frequency or frequency range. The RF characteristic database contains RF characteristic testing data observed for tested grain samples over one or more tested frequency ranges. The controller is configured to: (i) receive the RF sensor readings from the RF sensor subsystem; (ii) determine grain mass and a moisture content of the currently-harvested grain based, at least in part, on the RF sensor readings as compared to the RF characteristic testing data; and (iii) perform at least one action in response to determining the grain mass and moisture content of the currently-harvested grain.

CONCLUSION

There has thus been provided embodiments of a RF grain mass and constituent measurement system for usage onboard combine harvesters. Embodiments of the RF grain mass and constituent measurement system advantageously permit grain mass and grain constituent measurements with minimal calibration requirements. In embodiments, this is accomplished by capturing RF signal readings of the harvested grain at multiple frequencies within the RF domain and, perhaps, within the microwave and/or MMW frequency bands. Further, ground truth data is collected experimentally and utilized to construct RF characteristics, which are consolidated for storage in an RF characteristic database. Such characteristics correlate measurable RF attributes to known properties of the grain, such as grain mass, moisture content, and non-moisture constituent (e.g., oil, starch, protein, or cellulose) content levels. The RF attributes are conveniently measured in terms of propagation (phase) delay and/or attenuation (changes in magnitude or amplitude), with other measurements (e.g., polarization, power density distribution, reflection, and back scattering) also potentially considered by the controller of the measurement system in embodiments. In this manner, highly accurate, real-time measurements of grain parameters can be ascertained utilizing the RF grain mass and constituent measurement system providing operators and other individuals with additional pertinent information pertaining to various grains harvested utilizing combine harvesters.

As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A radio frequency (RF) grain mass and constituent measurement system utilized onboard a combine harvester, the RF grain mass and constituent measurement system comprising:

an RF sensor subsystem configured to capture RF sensor readings of a currently-harvested grain within an area of the combine harvester containing the currently-harvested grain;

a memory storing an RF characteristic database, the RF characteristic database containing RF characteristic testing data observed for tested grain samples over one or more tested frequency ranges; and a controller operably coupled to the RF sensor subsystem and to the memory, the controller configured to:
- receive the RF sensor readings from the RF sensor subsystem;
- identify a grain type of the currently-harvested grain;
- recall selected RF characteristics from the RF characteristic database corresponding to the identified grain type;
- determine grain mass and a first constituent content of the currently-harvested grain based, at least in part, on the RF sensor readings as compared to the RF characteristic testing data and utilizing the selected RF characteristics; and
- perform at least one action, including display or storing values associated with, or adjusting a component of the combine harvester, in response to determining the grain mass and the first constituent content of the currently-harvested grain.

2. The RF grain mass and constituent measurement system of claim 1, wherein the RF sensor subsystem comprises:
a first RF sensor configured to capture RF sensor readings of the currently-harvested grain at a first frequency or frequency range; and
a second RF sensor configured to capture RF sensor readings of the currently-harvested grain at a second frequency or frequency range different than the first frequency or frequency range.

3. The RF grain mass and constituent measurement system of claim 2, wherein the first frequency or frequency range is between 1 and 300 Gigahertz (GHz); and
wherein the second frequency or frequency range is between 1 and 300 GHz, while being different than the first frequency or frequency range.

4. The RF grain mass and constituent measurement system of claim 2, wherein the combine harvester includes a clean grain flow path extending from a grain cleaning section to a grain storage tank;
wherein the first RF sensor is positioned to capture RF sensor readings of the currently-harvested grain at a first location along the clean grain flow path; and
wherein the second RF sensor is positioned to capture RF sensor readings of the currently-harvested grain at a second location along the clean grain flow path downstream of the first location.

5. The RF grain mass and constituent measurement system of claim 4, wherein the first RF sensor and second RF sensor capture concurrent RF sensor readings of the currently-harvested grain without removal of the currently-harvested grain from the clean grain flow path.

6. The RF grain mass and constituent measurement system of claim 4, wherein the combine harvester includes a clean grain elevator through which the clean grain flow path extends;
wherein the first RF sensor is positioned to capture RF sensor readings of the currently-harvested grain when supported by a paddle of the clean grain elevator; and
wherein the second RF sensor is positioned to capture RF sensor readings of the currently-harvested grain when discharged through an outlet of the clean grain elevator.

7. The RF grain mass and constituent measurement system of claim 1, wherein the controller is further configured to:
recall, from RF characteristic testing data, RF characteristics for tested grain samples having varying moisture contents; and
estimate a moisture content of the currently-harvested grain based, at least in part, on the moisture content of at least one the RF characteristics identified as corresponding to the RF sensor readings.

8. The RF grain mass and constituent measurement system of claim 1, wherein the first constituent content of the currently-harvested grain, as determined by the controller, is selected from the group consisting of an oil content, a protein content, a cellulose content, and a starch content.

9. The RF grain mass and constituent measurement system of claim 1, wherein at least a subset of the RF sensor readings captured by the RF sensor subsystem measure a phase shift of RF energy when impinged against the currently-harvested grain; and
wherein the RF characteristic testing data includes testing data correlating observed RF energy phase shift over a tested frequency range.

10. The RF grain mass and constituent measurement system of claim 1, wherein at least a subset of the RF sensor readings captured by the RF sensor subsystem measure attenuation of RF energy when impinged against the currently-harvested grain; and
wherein the RF characteristic testing data includes testing data correlating observed RF energy attenuation over a tested frequency range.

11. A radio frequency (RF) grain mass and constituent measurement system utilized onboard a combine harvester, the RF grain mass and constituent measurement system comprising:
an RF sensor subsystem configured to capture RF sensor readings of a currently-harvested grain within an area of the combine harvester containing the currently-harvested grain;
a memory storing an RF characteristic database, the RF characteristic database containing RF characteristic testing data observed for tested grain samples over one or more tested frequency ranges; and
a controller operably coupled to the RF sensor subsystem and to the memory, the controller configured to:
- receive the RF sensor readings from the RF sensor subsystem;
- determine grain mass and a first constituent content of the currently-harvested grain based, at least in part, on the RF sensor readings as compared to the RF characteristic testing data; and
- perform at least one action, including display or storing values associated with, or adjusting a component of the combine harvester, in response to determining the grain mass and the first constituent content of the currently-harvested grain;
wherein the RF characteristic testing data comprises at least one RF signal response map plotting RF signal responses of the tested grain samples over a tested frequency range:
wherein the RF sensor subsystem comprises a first RF sensor configured to capture RF sensor readings of the currently-harvested grain over a frequency range overlapping with the tested frequency range; and
wherein the controller is configured to determine the grain mass and the first constituent content of the currently-harvested grain based, at least in part, on matching the RF sensor readings with a specific RF signal response included in the RF signal responses plotted on the RF signal response map.

12. A radio frequency (RF) grain mass and constituent measurement system utilized onboard a combine harvester, the RF grain mass and constituent measurement system comprising:
- an RF sensor subsystem configured to capture RF sensor readings of a currently-harvested grain within an area of the combine harvester containing the currently-harvested grain;
- a memory storing an RF characteristic database, the RF characteristic database containing RF characteristic testing data observed for tested grain samples over one or more tested frequency ranges; and
- a controller operably coupled to the RF sensor subsystem and to the memory, the controller configured to:
  - receive the RF sensor readings from the RF sensor subsystem;
  - estimate a moisture content of the currently-harvested grain;
  - recall selected RF characteristics from the RF characteristic database corresponding to the estimated moisture content;
  - determine grain mass and a first constituent content of the currently-harvested grain based, at least in part, on the RF sensor readings as compared to the RF characteristic testing data and utilizing the selected RF characteristics; and
  - perform at least one action, including display or storing values associated with, or adjusting a component of the combine harvester, in response to determining the grain mass and the first constituent content of the currently-harvested grain.

13. A radio frequency (RF) grain mass and constituent measurement system utilized onboard a combine harvester, the RF grain mass and constituent measurement system comprising:
- an RF sensor subsystem, comprising:
  - a first RF sensor configured to capture RF sensor readings of the currently-harvested grain at a first frequency or frequency range; and
  - a second RF sensor configured to capture RF sensor readings of the currently-harvested grain at a second frequency or frequency range different than the first frequency or frequency range;
- a memory storing an RF characteristic database, the RF characteristic database containing RF characteristic testing data observed for tested grain samples over one or more tested frequency ranges; and
- a controller operably coupled to the RF sensor subsystem and to the memory, the controller configured to:
  - receive the RF sensor readings from the RF sensor subsystem;
  - identify a grain type of the currently-harvested grain;
  - recall selected RF characteristics from the RF characteristic database corresponding to the identified grain type;
  - determine grain mass and a moisture content of the currently-harvested grain based, at least in part, on the RF sensor readings as compared to the RF characteristic testing data and utilizing the selected RF characteristics; and
  - perform at least one action in response to determining the grain mass and moisture content of the currently-harvested grain.

14. The RF grain mass and constituent measurement system of claim 13, wherein the controller is configured to estimate the moisture content of the currently-harvested grain by:
- recalling, from RF characteristic testing data, RF characteristics for tested grain samples having varying moisture contents; and
- estimating the moisture content based, at least in part, on identifying a specific RF characteristic corresponding to the RF sensor readings.

15. The RF grain mass and constituent measurement system of claim 13, wherein the controller is further configured to determine a first constituent content of the currently-harvested grain utilizing the RF sensor readings and the RF characteristic testing data.

16. The RF grain mass and constituent measurement system of claim 13, wherein the RF sensor readings captured by the RF sensor subsystem measure at least one of phase shift and attenuation of RF energy impinged against the currently-harvested grain; and
- wherein the RF characteristic testing data includes testing data correlating at least one of phase shift and attenuation over a tested frequency range for the tested grain samples.

17. The RF grain mass and constituent measurement system of claim 13, wherein the combine harvester includes a clean grain elevator;
- wherein the first RF sensor is positioned to capture RF sensor readings of the currently-harvested grain when supported by a paddle of the clean grain elevator; and
- wherein the second RF sensor is positioned to capture RF sensor readings of the currently-harvested grain when discharged through an outlet of the clean grain elevator.

18. The RF grain mass and constituent measurement system of claim 15, wherein the first RF sensor operates at a maximum frequency of $f_1$;
- wherein the second RF sensor operates at a minimum frequency of $f_2$; and
- wherein 1 gigahertz $< f_1 \leq 2f_2 <$ 300 gigahertz.

* * * * *